(12) United States Patent
Wassmus et al.

(10) Patent No.: US 9,585,509 B2
(45) Date of Patent: Mar. 7, 2017

(54) COOKING APPLIANCE

(71) Applicants: FRIMA-T SAS, Wittenheim (FR); FRIMA INTERNATIONAL AG, Heerbrugg (CH)

(72) Inventors: Reinhard Wassmus, Neuenburg (DE); Markus Lingenheil, Breisach/Oberrimsingen (DE); Pascal Gluck, Sausheim (FR); Kevin Spahlholz, Bad Bellingen/Bamlach (DE); Jean Vorady, Wittenheim (FR); Manuel Baehl, Staffelfelden (FR)

(73) Assignees: FRIMA-T SAS (FR); FRIMA INTERNATIONAL AG (CH)

( * ) Notice: Subject to any disclaimer, the term of this patent is extended or adjusted under 35 U.S.C. 154(b) by 25 days.

(21) Appl. No.: 14/437,033

(22) PCT Filed: Oct. 18, 2013

(86) PCT No.: PCT/EP2013/071856
§ 371 (c)(1),
(2) Date: Apr. 20, 2015

(87) PCT Pub. No.: WO2014/060583
PCT Pub. Date: Apr. 24, 2014

(65) Prior Publication Data
US 2015/0305541 A1    Oct. 29, 2015

(30) Foreign Application Priority Data
Oct. 19, 2012 (DE) .................. 10 2012 020 631

(51) Int. Cl.
*A47J 27/00* (2006.01)
*A47J 36/06* (2006.01)
(Continued)

(52) U.S. Cl.
CPC ......... *A47J 27/002* (2013.01); *A47J 27/0817* (2013.01); *A47J 27/14* (2013.01);
(Continued)

(58) Field of Classification Search
CPC ........... A47J 27/00; A47J 37/128; A47J 36/06
(Continued)

(56) References Cited

U.S. PATENT DOCUMENTS

| 1,952,733 A | * | 3/1934 | Smith | A47J 31/043 |
| | | | | 426/432 |
| 3,635,147 A | * | 1/1972 | Lee | A47J 36/165 |
| | | | | 366/147 |

(Continued)

FOREIGN PATENT DOCUMENTS

| DE | 1157148 | 11/1963 | ............... A47J 27/14 |
| DE | 2309673 | 8/1974 | ............... A47J 27/14 |
| FR | 2608033 | 6/1988 | ............... A47J 27/14 |

OTHER PUBLICATIONS

Machine translation DE 1157148 B.*
(Continued)

*Primary Examiner* — Kawing Chan
(74) *Attorney, Agent, or Firm* — Hayes Soloway P.C.

(57) ABSTRACT

A cooking appliance has a pivotable pot having a pot pivot axle and a pivotable lid having a lid pivot axle, and includes a common drive for pivoting the pot and the lid.

20 Claims, 6 Drawing Sheets

(51) Int. Cl.
    *A47J 36/12*    (2006.01)
    *A47J 27/08*    (2006.01)
    *A47J 27/14*    (2006.01)
    *A47J 37/12*    (2006.01)
(52) U.S. Cl.
    CPC ............... *A47J 36/06* (2013.01); *A47J 36/12* (2013.01); *A47J 37/128* (2013.01)
(58) Field of Classification Search
    USPC ...................................................... 220/573.1
    See application file for complete search history.

(56) References Cited

U.S. PATENT DOCUMENTS

| | | | | | |
|---|---|---|---|---|---|
| 4,042,221 | A * | 8/1977 | Myers | ...................... | B01F 13/06 366/146 |
| 4,173,925 | A * | 11/1979 | Leon | ........................ | A47J 27/14 219/389 |
| 4,811,657 | A * | 3/1989 | Rixen | .................... | A47J 31/061 99/295 |
| 6,425,320 | B1 * | 7/2002 | Chameroy | ........... | A47J 27/0806 126/373.1 |
| 6,777,010 | B1 * | 8/2004 | Rolle | .................... | A47J 37/047 426/238 |
| 7,134,385 | B1 * | 11/2006 | Richard | ................... | A47J 36/12 220/812 |
| 7,901,721 | B2 * | 3/2011 | Oosterling | ............ | A47J 37/047 426/466 |
| 2008/0282904 | A1 * | 11/2008 | Liu | ........................ | A47J 36/165 99/352 |
| 2015/0366393 | A1 * | 12/2015 | Fareham | ............... | A47J 27/004 99/348 |

OTHER PUBLICATIONS

International Preliminary Report on Patentability issued in corresponding PCT Patent Appln. No. PCT/EP2013/071856 dated Apr. 30, 2015 (5 pgs).

International Search Report (no translation) issued in application No. PCT/EP2013/071856, dated Jan. 14, 2014 (9 pgs).

* cited by examiner

COOKING APPLIANCE

FIELD OF THE INVENTION

The invention relates to a cooking appliance comprising a pivotable pot having a pot pivot axle and a pivotable lid having a lid pivot axle.

BACKGROUND

Cooking appliances comprising a pivotable pot are also referred to as dumpers. They are all-round appliances offering the possibility to warm up, cook, roast or deep-fry in them. The pots can be pivoted frontward to the operator in order to empty the pot. As the pots are heavy especially in the filled state, said process of tilting is usually effected by a motor. Furthermore, the pots can be closed with a pivotable lid which is actuated manually or by motor power. Here, the pivot axle of the lid is offset from the pot on the frame of the cooking appliance and usually is situated in the area of the upper end of the pot remote from the operator.

It is the object of the invention to provide a fail-safe cooking appliance with the smallest possible expense but with comfortable functions.

SUMMARY

The present invention provides a cooking appliance comprising a pivotable pot having a pot pivot axle and a pivotable lid having a lid pivot axle. A common drive is provided for pivoting the pot and the lid.

Due to the fact that the lid can be pivoted in a motorized fashion, the operator of the cooking appliance is able to open and close the pot in a simple way and, above all, within short time and without physical effort. The singular drive significantly reduces the expense and the costs for the motorized drive of the pot and the lid as compared to the currently existing pot lids that are moved in a motorized fashion separately from the pot.

In the prior art, it is relatively elaborate to coordinate the motor-induced movements of the lid and the pot, so that there is no collision between the pot and the lid. By way of example, the lid, if driven by motor power, must not be lowered until the pot has reached its zero position, i.e. its cooking position. On the other hand, the possibility of lifting the pot should only exist if the lid has been opened completely or to a sufficient extent.

This also permits a motor to be used for automatically lowering and removing cooking products in suitable containers attached to the lid. In this context, completely closing the lid and opening it may also be effected by hand.

The invention provides that the drive is coupled to a mechanism which converts the drive energy into a movement of the pot or of the lid in a temporally staggered manner.

The measure of coupling the pot and the lid by means of a common drive allows for a relatively simple, in part purely mechanical decoupling of the movements of pot and lid, so that a collision between the pot and the lid cannot occur.

Preferably, a swiveling lever is respectively connected to the pot pivot axle and/or to the lid pivot axle in a torque-proof manner, said swiveling lever(s) being coupled to the drive. In a relatively simple manner, the swiveling lever allows to exert high torques on the pivot axle, so that the power of the drive may be reduced.

The pot pivot axle and the lid pivot axle may be coupled to each other via a linkage. A linkage represents a simple, robust and especially low-cost way of transmitting the force of the drive to the pivot axles.

According to the preferred embodiment, the drive is integrated in the linkage and propels it.

In particular, the drive is a linear drive, for instance an electrical lifting cylinder, with the linear drive being capable of assuming different stop positions. Such a linear drive can be implemented at low cost, on the one hand, and on the other hand it is easy to accommodate it at the side of the pot on or in the cooking appliance.

Further, the linear drive may be constructed such that it can be stopped at any stop position. This can be realized in a particularly simple manner in the connection with an electrical lifting cylinder.

The linear drive may also form a linkage portion, i.e. span two linkage portions, so that it is situated directly in the force transmission path from the pot pivot axle to the lid pivot axle. This also allows to save installation space.

The linear drive may have its two axial ends coupled to bearings which can be moved through it. This means that the linear drive is arranged between the bearings in a "flying" manner and is able to move the bearings on both ends, with one end being associated to the pot and the other end being associated to the lid, so that a movement of the pot or of the lid is brought about with the movement of a respective bearing.

Despite of the two movable bearings, only one of the two bearings is moving at a time, which is effected by devices for temporarily restricting the degree of freedom of at least one of the two bearings. This ensures that either the lid or the pot is moved and a collision between the lid and the pot cannot occur.

The device for restricting the degree of freedom of at least one bearing is a first stop, for instance, limiting the lid's swiveling movement during the opening process and engaging, for instance, the lid-side axial end of the linear drive. The first stop is arranged with respect to the linear drive, in particular with respect to the movable bearing, in such a manner that said stop is effective not until the lid starting from the closed position has been swiveled into the fully opened position. In this open position, the stop prevents any further movement of the linear drive toward the lid, i.e. prevents the lid from being further opened. As from the moment of having reached the first stop, the pot-side axial end of the linear drive is moved, whereby the pot is swiveled after the process of opening the lid.

According to one configuration, the invention provides for the lid to be moved to the closed position by motor power.

The preferred embodiment of the invention makes provision that there is no rigid stop for the linear drive in the initial position, if the lid is closed and/or almost closed (depending on whether the lid has been moved completely or almost completely to the closed position by motor power or whether a cooking product cage attached to the lid is moved to the cooking product lowering position), and if the pot is in the cooking position. The drive, however, has such a position relative to the pivot axles, in particular due to the lever ratios, that the weight force of the pot which is higher than that of the lid first brings about a movement of the lid-side end of the linear drive, with the pot-side end remaining stationary due to the weight force.

The lid-side end of the linear drive may be provided with a guide for the linear drive; stops, preferably rigid stops being placed or formed in particular on the axial ends of the guide.

The guide may be formed in a very simple manner by an elongated hole in which a drive-side protrusion may travel. It would also be possible, of course, to realize an inverse construction, i.e. to provide the drive with a groove or an elongated hole moving along an immovable protrusion.

Normally, any deactivation of the drive, especially if it is an electrical drive, does not occur in such an abrupt fashion that there is no overrun. Rather, it is normal that drives exhibit an overrun length when they have reached a predefined stop position, in particular an end position. Among other things, the overrun length is due to a specific switching time of the employed switch or sensor, as soon as the predefined position of the pot or of the lid or of the drive has been reached, due to the switching period of the control unit as well as due to the overrun time of the drive as from the moment of receiving the corresponding control signal or as from the moment of power interruption. In order to avoid the situation that the lid or the pot still performs any mentionable pivoting movement during the overrun of the drive, the invention makes provision that the elongated hole comprises an overrun portion on at least one end. In this overrun portion, the protrusion moves within the overrun length of the linear drive or vice versa, so that in the figurative sense the overrun length of the drive after its deactivation is situated in this overrun portion. The overrun portion of the elongated hole has an edge which delimits the elongated hole and is realized in the form of an arc portion whose center lies on the imaginary center axis of the lid pivot axle. This means that there is no lifting movement during the overrun period, as the protrusion travels along a path which describes an arc portion around the lid pivot axle. This is why the distance of the protrusion to the lid pivot axle remains unchanged during the overrun period. The elongated hole may have an end which slopes down vertically in an oblique or straight fashion. The protrusion is situated in this area if the lid is raised. The sloping end of the elongated hole results in a lowering motion of the protrusion and hence of the lid if this sloping end or portion of the elongated hole is reached. In order to minimize the downward movement of the lid, a damping device may be provided.

One embodiment of the invention makes provision for a linkage between the pivot axles of the pot and of the lid, said linkage being moved by the drive. This linkage is constructed such that it does not have an entirely linear extension in any position of the pot and the lid, but always comprises a bend.

According to one embodiment, the bend in the linkage is situated at the coupling point between the linear drive and that part of the linkage which extends from the linear drive toward the lid pivot axle.

The afore-mentioned damping device may be present, for instance, in proximity to the bend of the linkage.

The preferred embodiment makes provision that electrical switching elements such as electrical micro switches, proximity switches, Reed switches or Hall contact switches or the like are provided at the end of the travel length or at both ends, i.e. as from the moment of reaching end positions, said switching elements detecting the reaching of this position. This allows for the triggering of the drive via the control unit and/or in a purely electrical fashion.

A further, potentially additional or alternative possibility to suppress the overrun length or to avoid it completely, is to provide an electrical braking device for braking the drive as from the moment of reaching at least one predefined position of the drive or of the lid or of the pot.

The electrical braking device may comprise a braking circuit which is designed such that it delivers an inverse current or a short-circuit for the drive. This results in the motor of the drive being stopped with a short delay or even without any delay.

The drive may comprise a DC motor. The preferred embodiment makes provision that the protrusion is also a pivot axle for a force transmission part, usually a rod or a gas pressure spring, with the option that the pivot axle defines the lid-side bearing of the linear drive. As already said, one embodiment of the invention makes provision that the lid pivot axle is coupled to a gas pressure spring via which a torque is exerted on the lid pivot axle for opening and/or closing, with the gas pressure spring allowing for a mechanical pivoting of the lid. This is supposed to allow a quick intervention of the operator, in order to quickly raise the lid manually or move it to the closed position via an externally attached handle.

Further, a safety locking means may be provided which prevents the transmission of the mechanical opening/closing force on the lid to the pot pivot axle. This measure prevents any movement of the pot if the operator intervenes and swivels the lid by hand.

The opening movement of the lid may also be carried out by the linear drive and by the gas pressure spring, too. By way of example, it is conceivable that one section of the opening movement of the lid is effected by the linear drive and a second, preceding or subsequent section is accomplished by the gas pressure spring. It would also be conceivable, for example, but not to be understood in a limiting sense, that the lid is slightly lifted first by the drive, so that the angular position of the lid relative to the gas pressure spring or of the gas pressure spring relative to the other parts of a linkage is changed and the torque exerted by the gas pressure spring is increased in this way. Subsequently, the gas pressure spring is able to bring about the subsequent, second part of the opening movement of the lid by its own, for instance.

In the reverse case, during closing the lid, a first or a second section may be accomplished by hand.

In one configuration, the lid can be closed up to a specific point and the final closing is then effected by the drive or vice versa.

One embodiment of the invention makes provision that completely opening and completely closing the lid may additionally also be carried out by hand, for instance in order to get access to the interior of the pot in the event of a power blackout.

The elongated hole of the guide may have a curved profile and may comprise a locking portion which is oriented transverse to a lid-side force transmission part, the opened lid being supported on the locking portion via the force transmission part. This variation provides for a sort of self-locking or self-retention of the system—with the lid being in the open state—and hence for the safety locking means. The lid is kept in the fully opened position and supported in this state in a purely mechanical fashion without exerting any force on the drive. The same applies to the process of closing the lid.

Stops, in particular exclusively rigid stops are provided for the movement of the drive and the components moved by the drive; said stops will be contacted in temporal succession during actuation of the drive in one direction, so that either the lid or the pot is swiveled. This is why only one end of the linear drive is moving at a time.

DETAILED DESCRIPTION

Figure 1:
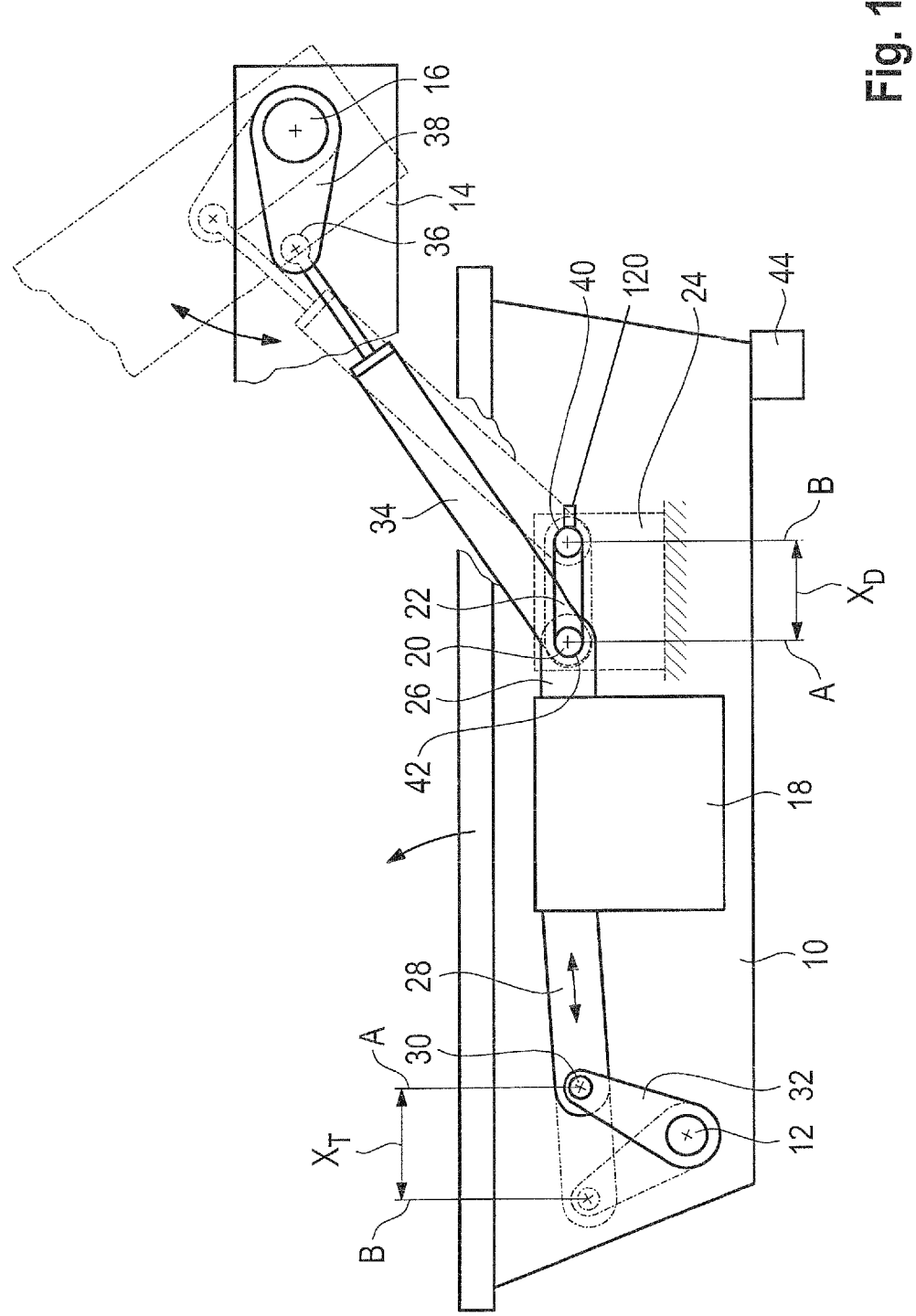
FIG. 1 is a schematic side view of the cooking appliance of the invention according to a first embodiment.

FIG. 1 shows a cooking appliance comprising a pot 10 which can be tilted in frontward direction about a driven pot pivot axle 12, in order to empty the pot from the cooking product or, more generally, the goods situated in the pot. The pot pivot axle 12 is supported on a (not illustrated) frame, with the pivot axle 12 being coupled to the pot 10 in a torque-proof manner so that a rotation of the pot pivot axle 12 results in a tilting of the pot 10.

The pot 10 can be closed with a lid 14 which can be swiveled by means of a rotatable lid pivot axle 16. A continuous line partially shows the lid in the closed position, a dot-and-dashed line shows it in the fully raised position.

The lid pivot axle 16 is also supported on the frame of the cooking appliance and is connected to the lid 14 in a torque-proof manner.

A common drive 18, here in the form of a linear drive, is provided for swiveling the pot 10 and the lid 14.

In the illustrated embodiment, the linear drive is an electric lifting cylinder.

The drive 18 has its lid-side end provided with a bearing 20 which is formed by a protrusion defining a pivot axle and received in a guide in the form of an elongated hole 22.

The elongated hole 22 is formed in a housing-side bearing block 24, for example, but this is not to be understood in a limiting sense. The bearing block 24 is illustrated with broken lines.

The bearing 20, to be more precise the protrusion, is coupled to a supporting member 26 forming a stationary part of the drive 18. The supporting member 26 may be extendable, but in the present case the supporting member 26 is a non-extendable end of the drive 18 in the form of a forked head, whereas the opposite end of the drive 18 is provided with an extendable rod 28 whose free end forms or carries a bearing, i.e. a pot-side bearing 30.

The pot-side bearing 30 is a pivot axle to which the rod 28 is coupled via a swiveling lever 32. The swiveling lever 32, in turn, is coupled to the pot pivot axle 12 in a torque-proof manner.

At the opposite end of the linear drive 18, the bearing 20 is coupled to a force transmission part 34 which may be a rod or, as in the present case, a gas pressure spring, for example. At its opposite end, the force transmission part 34 is coupled via a bearing 36 to a swiveling lever 38 which is coupled to the lid pivot axle 16 in a torque-proof manner.

The illustrated construction comprising the swiveling levers 32, 38, the force transmission part 34 and the individual bearings 20, 30, 36 as well as the drive 18 forms a linkage in which the drive 18 is integrated and which forms a linkage portion. Thus, the drive 18 is disposed in the direct force flow path between the pot pivot axle 12 and the lid pivot axle 16 and is, so to speak, arranged in series relative to the other parts of the linkage.

The bearings 20, 30 for the drive 18 can be both moved by the linear drive 18, so that there is a sort of floating or flying mounting for the drive 18.

Several stops are provided which ensure that always exactly one bearing 20 or 30 is moved by the activated linear drive 18. Said stops constitute a device for restricting the degree of freedom of at least one of the bearings 20 or 30.

A first stop 40 is formed by the axial end of the edge of the elongated hole 22 associated to the lid.

A second stop 42 is defined by the opposing edge, i.e. the opposite axial end of the elongated hole 22.

A third stop 44 is formed by the abutting of the pot on the frame in the cooking position.

In the illustrated embodiment, only rigid, i.e. not switchable and immovable stops are provided.

The first stop 40 provided at the lid-side axial end of the linear drive is intended for limiting the lid swiveling movement, as explained in the following.

In the initial position in which the pot 10 is in the cooking position and hence rests on the third stop, which is the pot stop 44, i.e. a position in which the pot is horizontally aligned and the lid 14 closes the pot 10, the bearings 20, 30 are in position A, i.e. have the smallest distance between them. Here, the bearing 20, to be more precise the corresponding drive-side protrusion projecting into the elongated hole 22 may rest against the stop 42.

If the drive 18 is switched on, the rod 28 will be extended further. The lever system, however, is designed such (and the pot 10 has such a weight in relation to the lid 14) that the bearing 30 remains in the position A, whereas the bearing 20 moves to the right along the guide 22, so that the force transmission part 34 is also entrained to the right and, in this process, pivots the swiveling lever 38 in the clockwise direction and hence swivels the lid 14 so as to open it.

The opening movement for the lid 14 will be stopped if the bearing 20 or the drive-side protrusion forming the bearing reaches the first stop 40 (position B). In this position, as in any other intermediate position, the drive 18 can be stopped. If the pot 10 is to be swiveled subsequently, the drive 18 is further operated in the same direction, the rod 28 will be extracted even further and pivots the swiveling lever 32 by the movement of the bearing 30 into the position B. With this, the pot 10 is tilted.

Optionally, a further mechanical stop may be provided which is positioned, for instance, so as to be situated in front of the swiveling lever 32 in the pivoting direction; in the position B, the swiveling lever 32 is pressed against said stop. If the pot 10 is tilted and the lid 14 is raised, the bearings 20, 30 each are in position B.

The pivoting angle of the pot 10 is larger than or equal to 60°, but it may also be stopped at any intermediate position.

However, it is important that in each position of the pot 10, including the maximum position, the center of gravity of the pot 10 is always behind the pot pivot axle 12, i.e.

between the pivot axles 12, 16, so that there will be no force inversion from a compressive load to a tensile load for the drive.

The travel distance for the bearing 20 is the stroke length $x_D$, i.e. the travel distance for the lid. The stroke length of the bearing 30, which is designated with $x_T$ in FIG. 1, is the travel distance for the pot 10.

During the reverse pivot motion of pot 10 and lid 14, the pot 10 will pivot back first due to gravity, with the drive 18 being supported by the stop 40 and the rod 28 still being subjected to a compressive load.

If the pot 10 has reached its horizontal position and rests on the pot stop 44, the bearing 30 is again in position A. If the linear drive 18 continues to be actuated in the same direction, the lid 14 will be swiveled in reverse direction by the bearing 20 being moved in the guide 22 back to position A. Here too, the gravitational force of the lid can bring about said closing motion, so that the drive 18 acts as a brake. Depending on the geometry, it is also possible, of course, that a tensile force has to be exerted for closing the lid 14.

The gas pressure spring allows the operator of the cooking appliance to manually open or close the lid 14 in part or to the full extent. In this case, the stroke $x_D$ is used for carrying out a small angular movement of the lid, for instance in order to immerge a cooking product provided in a basket attached to the lid in a cooking medium (oil, water, . . . ) and to lift it out again.

The embodiment according to FIG. 2 essentially corresponds to that of FIG. 1, so that only the differences will be discussed in the following. The reference numerals introduced so far are maintained unchanged for identical parts or parts with the same function.

Figure 2A:
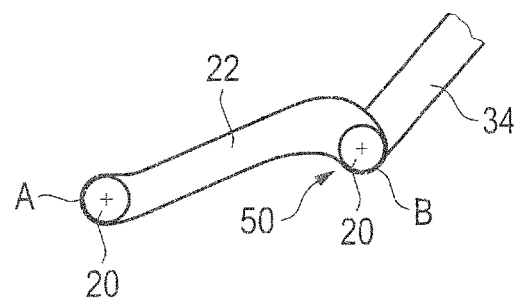
FIG. 2a is an enlarged side view of the guide for a bearing illustrated in FIG. 2.
Figure 2:
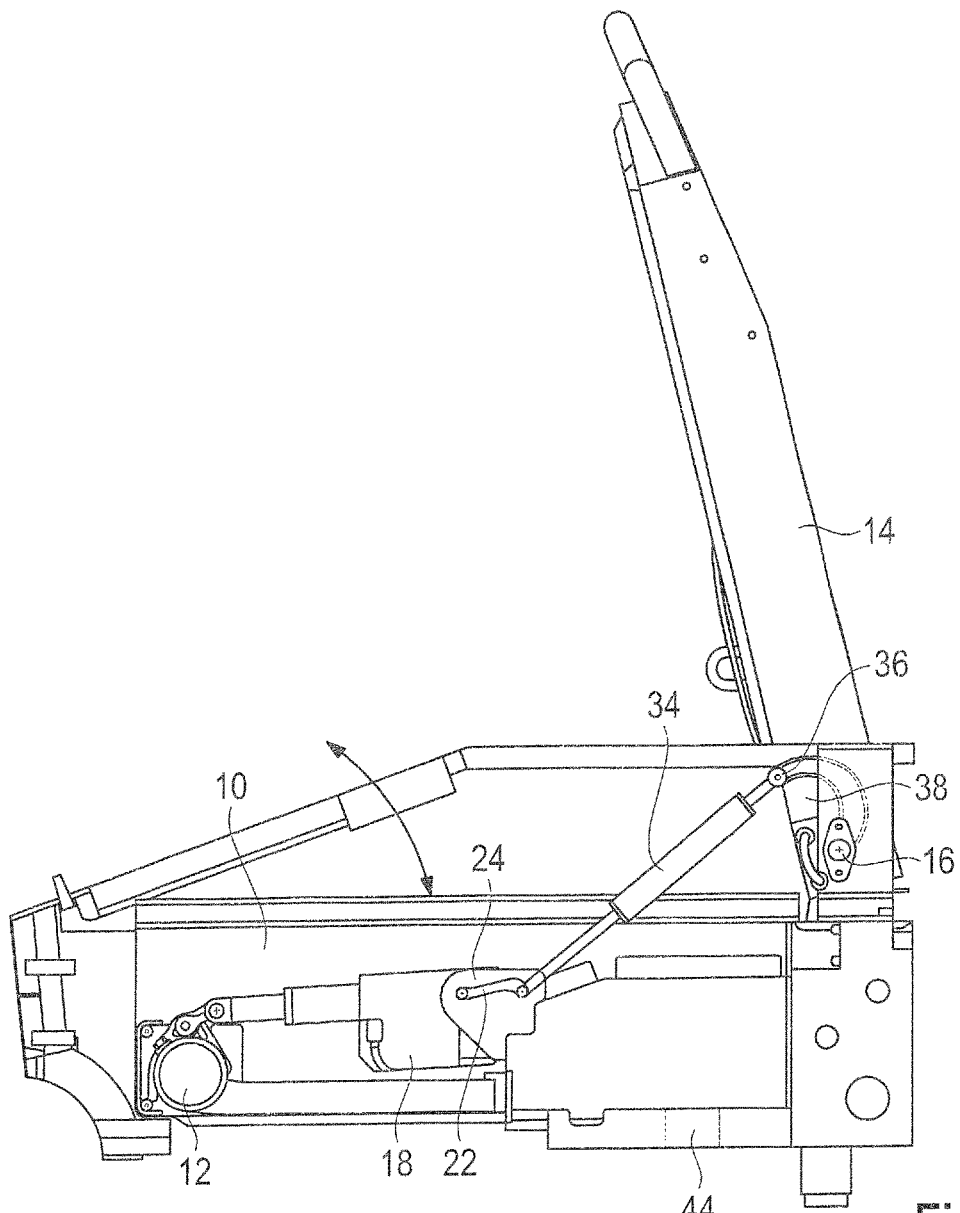
FIG. 2 is a side view of the cooking appliance according to the invention in a slightly modified variation.

The basic difference between the embodiments according to FIG. 1 and FIG. 2 is that a safety locking means is provided which—during the mechanical opening or closing process, i.e. during manually opening and/or closing the lid—prevents the force from being transferred to the pot pivot axle 32.

In the embodiment according to FIG. 2, the safety locking means comprises the guide or the elongated hole 22 which has a special shape. Specifically, the corresponding elongated hole 22 has a curved profile at its right side which is the lid side, to be more precise is curved obliquely to the bottom. The corresponding portion of the elongated hole is referred to as a locking portion 50. This locking portion 50 extends transverse to, substantially perpendicular to the lid-side force transmission part 34, to be more precise perpendicular to its line of action in the opened position of the lid (see enlarged view of the elongated hole 22 in FIG. 2a). Due to said curvature of the elongated hole 22, the bearing 20, here again the protrusion, which couples the drive 18 to the force transmission part 34, can be pressed against the edge of the elongated hole 22 without slipping off from it. This results in a stable self-locking position. The force which is exerted on the lid 14 is directly introduced into the bearing block 24 and not into the remaining linkage.

The elongated hole 22 (safety locking means) is also constructed such that only a small relative movement is produced at the lid if the bearing 20 reaches the stop 40 (or if the pot reaches the stop 44), i.e. during the change from the motion of the pot to the motion of the lid. This allows the implementation of a simple way of switching off the drive 28, having passed through the pot stroke Xt, with usual micro switches or proximity switches and hence with a necessarily small overrun of the drive without producing any undesired movement at the lid.

In other words, the shape of the elongated hole 22 is chosen such that any inaccurate deactivation of the drive does not result in an undesired movement of the lid 14 when the bearing 30 has reached the position A and the pot has reached the cooking position on the stop 44.

With a suitable design of the elongated hole 22 (as illustrated in FIG. 2a, for instance), a further safety function can be achieved by means of an integrated safety device with a switching element for the bearing 20 in position A (stop 40). As soon as at any time during traversal of the stroke Xt (bearing 30 from position B to position A, i.e. lowering the pot) an inadmissible resistance results in an excessively high force (e.g. a collision with an object below the pot, a contusion of the hand of the operator, . . . ), the bearing 20 leaves the position B (moves away from the stop 40), which allows a rapid deactivation of the drive with a proximity switch or micro switch 120 which is attached at stop 40 and monitors the position of the bearing 20. Thus, said integrated safety device is able to prevent, on the one hand, any damage on the mechanical system of the apparatus (linkage), and any injury of the operator as well.

It goes without saying that the linear drive may alternatively also be installed in a state of being turned by 180°, i.e. the rod 28 is provided on the lid-side end of the drive.

Figure 3:
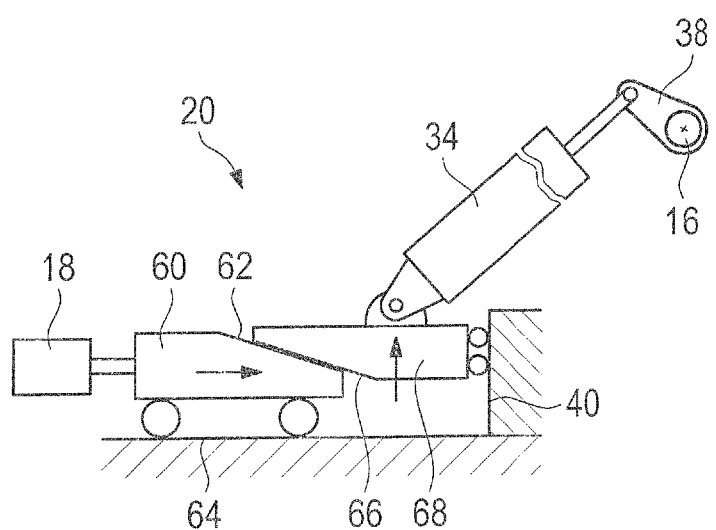
FIG. 3 is a schematic view of an optional coupling between the drive and a force transmission part extending toward the lid.

FIG. 3 shows a variation of the coupling point between the linear drive 18 and the force transmission part 34. Instead of a firm coupling via the bearing 20, a bearing 20 is provided here which allows to realize a force deflection means including stops with the aid of inclined planes and levers. By way of example, the drive 18 propels a part 60 comprising an inclined plane 62 which can be moved along a guide 64. The inclined plane 62 is contacted by an inclined plane 66 of a second part 68. The part 68 is in turn supported in a direction transverse to the guiding direction of the part 60, here perpendicular thereto, for example. The force transmission part 34 is coupled to the part 68.

If the linear drive 18 is powered and propels the part 60 to the right, the part 68 is moved upward by the inclined planes 62, 66 and hence the force transmission part 34 is moved upward as well, to lift the lid 14.

The part 60 is moved until it has reached the first stop 40. Subsequently, the opposite bearing 30 of the linear drive 18 is moved.

A peculiarity of the drive system for swiveling the pot 10 and the lid 14 is that—despite providing only one common drive by exclusively rigid stops—said stops will be reached in temporal succession during actuation of the drive in one direction, so that either the lid or the pot is swiveled and only one end of the linear drive is moved in each case.

The drive also allows stopping of the lid and the pot in any desired position.

The embodiment according to the FIGS. 4 to 9 corresponds most closely to that one of FIGS. 2 and 2a, but some details are different and will be explained in the following.

As above, however, the already introduced reference symbols are used again for the same parts or parts with the same function, so that it is unnecessary to discuss them in detail with respect to said parts, and only the differences are set out in the following.

In the embodiment according to FIGS. 4 to 9, the elongated hole 22 is contracted so as to be open to the top at its end near the drive, so that the bearing 20 can be inserted from above, providing for a faster and easier assembly and disassembly of the drive 18.

The elongated hole 22 comprises different portions, namely the first portion 96 extending obliquely downward from the open end and away from the drive, as well as an adjoining portion 98 pointing slightly obliquely upwards toward the lid pivot axle 16, and a third portion 100 which extends obliquely downward and has the locking portion 50 situated therein.

Figure 4:
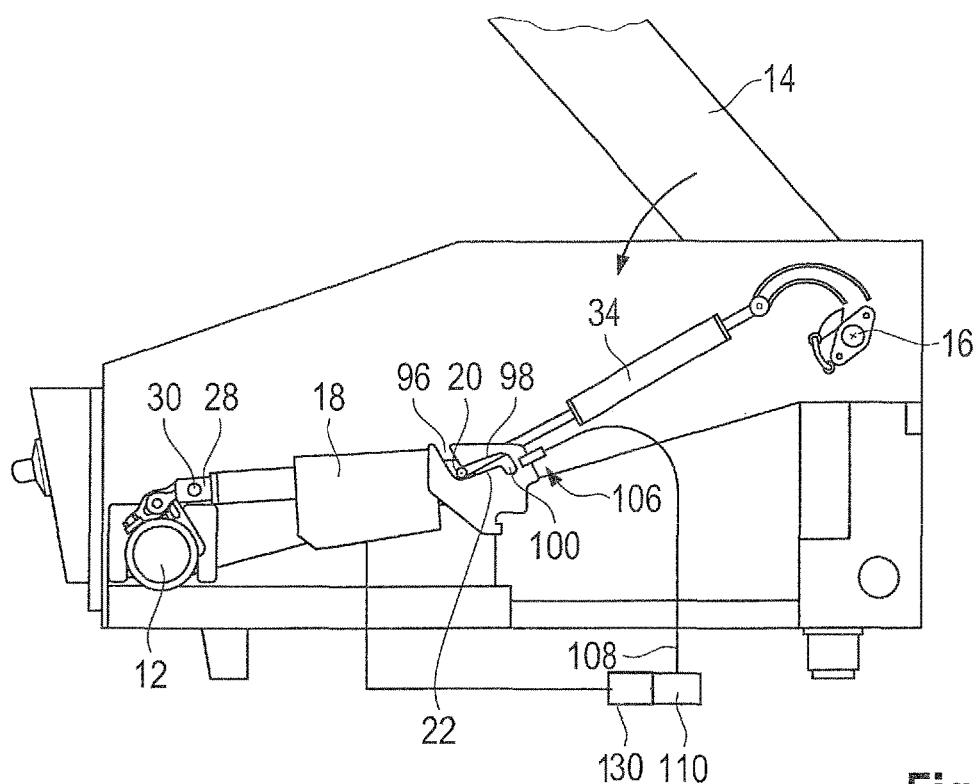
FIG. 4 is a schematic side view of a second embodiment of the cooking appliance according to the invention in a situation before the lid has been fully opened or closed.

In the position shown in FIG. 4, the pot is not swiveled, but the lid 14 has been manually opened in part, so that the gas pressure spring 34 is extended at least partially.

Figure 6:
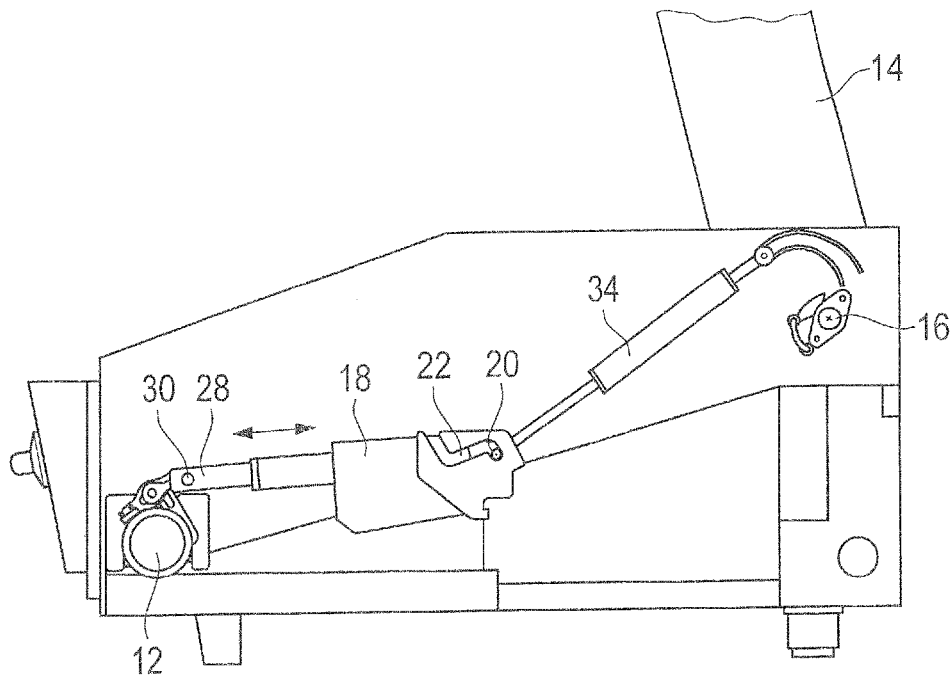
FIG. 6 shows the cooking appliance of FIG. 4 with a fully opened lid.

However, the lid 14 can be moved out of its closing position by means of the drive 18, which is a more frequent practice. Then, the bearing 20 is moved from the initial position shown in FIG. 4, related to FIG. 4 to the right along the ramp-shaped portion 98 extending obliquely upwards, until the bearing 20 arrives at the portion 100 of the elongated hole 22, which slopes down again in oblique fashion and in which the bearing 20 comes to lie as illustrated in FIG. 6, for instance. In this position, the lid 14 is open by a certain amount, for instance 20° to 30°. The remaining opening movement up to the fully opened state, which can be seen in FIG. 6, is then effected by hand or by means of the gas pressure spring 34. In this state, the gas pressure spring is in the maximally extended state. If the linear drive 18 is actuated further, the pot 10 is pivoted exclusively by the linear drive 18 until the state shown in FIG. 7 is reached.

Swiveling the pot 10 in the reverse direction is again effected by the drive 18. In this process, the lid 14 stays completely open.

Figure 5:
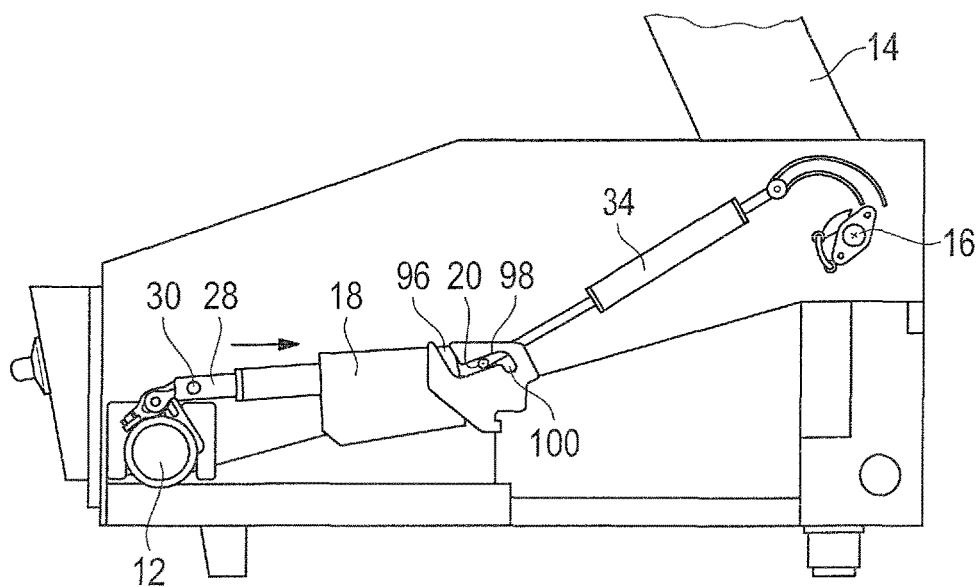
FIG. 5 shows the cooking appliance of FIG. 4 in a still further opened position of the lid, but during the beginning of the closing motion.
Figure 7:
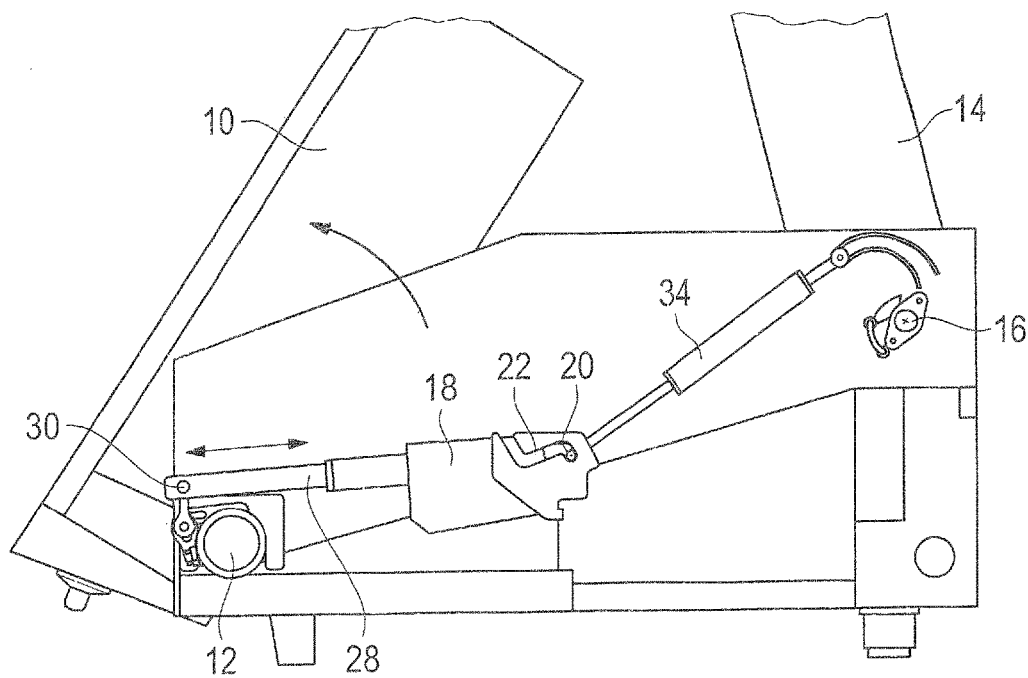
FIG. 7 shows the cooking appliance of FIG. 4 with a fully tilted pot.

If the lid 14 is to be closed again, the bearing 20 first has to be taken out of its self-locking position assumed by the bearing 20 in the state shown in FIGS. 6 and 7. To this end, the drive 18 continues to move and the rod 28 continues to retract. With this, the bearing 20 also leaves its downward bent portion 100 of the elongated hole 22 and moves toward the bottom along the downward sloping ramp surface (portion 98), as is illustrated in FIG. 5.

If the position of FIG. 4 has been reached again, the lid 14 can be completely swiveled in the downward direction. In this position, the bearing 20 again is in the self-locking position in a stable manner, and the force applied by the gas pressure spring 34 onto the bearing 20 due to lowering the lid 14 by hand does not have the effect of moving the bearing 20 upward to the obliquely ascending portion 96 of the elongated hole 22.

Figure 8:
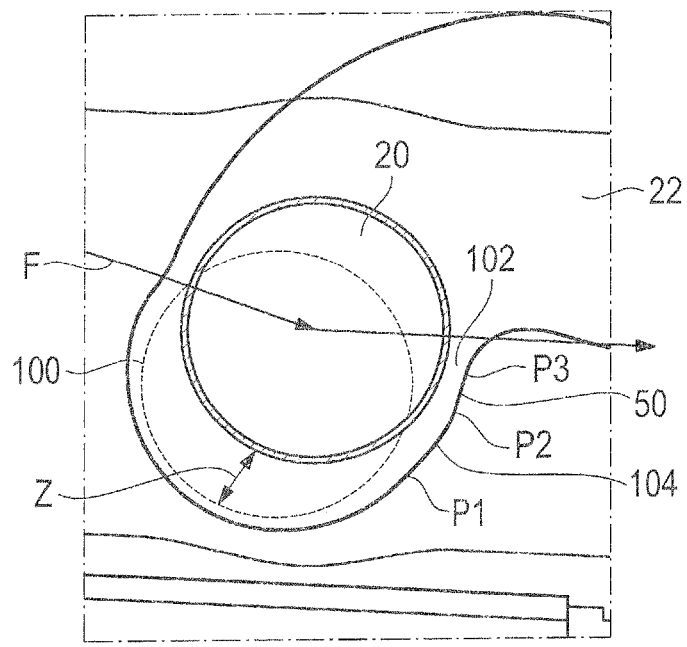
FIG. 8 is an enlarged view of the lid-side end of the elongated hole which can be seen in FIGS. 4 to 6, as seen in a view with reference to FIG. 4 out of the drawing plane.

FIG. 8 shows an enlarged view of the portion 100 of the elongated hole 22 which is closest to the lid pivot axle 16. It is to be noted that for the sake of a better presentation, the elongated hole 22 is illustrated with an exaggerated width in the area of the portion 100, so that an oversized gap appears between the edge 102 (limiting the portion 100) and the bearing 20. It goes without saying that the bearing 20 always rests against the edge 102 limiting the elongated hole 22 and is not spaced from the two opposite edge portions, as it is drawn in FIG. 8 to better illustrate the edge profile.

Between the points P2 and P3, the portion 100 comprises the locking portion 50 which extends in linear fashion, is extremely short and in which the edge which is contacted by the bearing 20 extends at least at right angles to the direction of the force F which is exerted by the weight force of the lid 14 on the edge 102 via the gas pressure spring 34. This force represents the supporting force, for which it is crucial that the supporting force and the orientation of the edge 102 in the area of the locking portion 50 do not cause the bearing 20 to slip out of the portion 100.

The edge 102 may be angled in the locking portion 50 also with such an inclination that the bearing 20 moves toward the point P2 if it rests against the edge 102 with pressure.

A so-called overrun portion 104 is provided so as to be immediately or approximately immediately adjacent to the locking portion 50. The edge 102 which is contacted by the bearing 20 forms an arc portion whose center lies on the imaginary center axis of the lid pivot axle 16.

This means that the opening angle of the lid 14 does not change if the bearing 20 slides on the edge 102 between the points P1 and P2.

Z designates the maximum overrun length which can be traversed by the bearing 20, if the lid 14 is in its maximally open position.

Said open position 14 is detected by means of a sensor 104 which may also be implemented as a switch. Said switch or sensor 104 is coupled to the control apparatus of the cooking appliance via a cable 108.

The switch or sensor 104 may be, for instance, a proximity switch, a Reed or Hall contact or a micro switch or the like.

Up to the moment when the switching movement or the reaction of the sensor 104 is completed and the drive 18 is switched off and will come to stop finally, a few milliseconds elapse resulting in an overrun which is also reflected in a movement of the bearing 20.

The overrun portion 104 is provided in order to ensure that said overrun does not result in a further pivoting movement of the lid 14 or only in an insignificant one.

An additional or optional variation makes provision that an electrical braking device 110 incorporating micro switch 120 and braking circuit 130 is made available which may be part of the control unit. Said electrical braking device 110 for braking the drive 18 is actuated as from the moment of reaching the fully opened position of the lid 14. As soon as the switch or sensor 106 detects that this predefined position has been achieved, an electronic braking circuit produces or triggers a reverse current or a short-circuit for the drive 18, resulting in a quick, abrupt and clearly shortened overrun.

It is to be noted that—in the fully opened position of the lid 14 as illustrated in FIG. 6—the self-locking of the system shown in FIGS. 2a and 8 ensuring that the lid 14 can reliably stay in the opened position and allowing a manual closing of the lid 14, is not limited to the design comprising the special linkage which is shown. Other guides for the bearing 20 are also possible, for instance with the aid of a rack and a pinion or the like, so that said self-retention principle is not limited to the illustrated embodiment or the illustrated transmission or linkage.

The afore-mentioned self-locking principle should also be realized at the opposite end of the elongated hole 22, namely in the portion 96, so that the location of the bearing 20 in the position shown in FIG. 4 is stable. Here, any wiggling motions due to slight possible displacements of the bearing 20 should not be possible, as this would give the impression of bad quality, as there would be some clearance on the lid, and noises could be produced.

Figure 9:
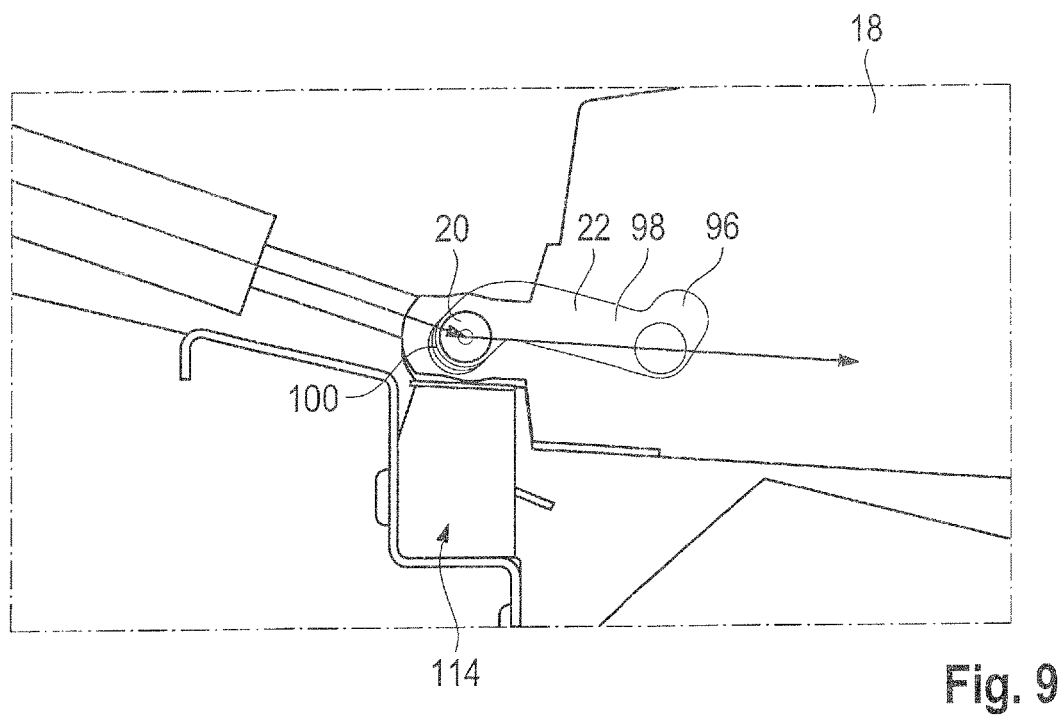
FIG. 9 is a schematic view of the transition between the gas pressure spring and the linear drive according to FIG. 4, likewise in a view as seen out of the drawing plane with respect to FIG. 6.

A damping device 114 shown in FIG. 9 also contributes to a higher quality of the cooking appliance.

By way of example, the damping device 114 is arranged underneath the bearing 20 in the area of the portion 100 of the elongated hole 22 such that the bearing 20—or a portion connected to it, for instance a bearing eye—strikes the damping device 114 if the bearing 20 slides down in the portion 100. In the portion 100, the bearing 20 actually can "fall down". The damping device 14, which may be a mechanical, hydraulic or pneumatic machine element, alleviates this abrupt sinking of the bearing 20.

The positions of the individual working points of the driven parts or of the individual elements of the linkage may also be implemented such that the gas pressure spring 34 also brings about the closing motion in parts, and hence does not only provide for an opening torque, but also for a closing torque. As the points of articulation of the gas pressure spring 34 change during the movement of the drive 18 and the opening/closing motion of the lid 14, the corresponding lever ratios and torques will change, too.

The invention claimed is:

1. A cooking appliance comprising a pivotable pot having a pot pivot axle, a pivotable lid having a lid pivot axle, and a common linear drive coupled to the pot and to the lid for pivoting the pot and for opening and closing the pot by driving the lid in the open and closed positions.

2. The cooking appliance according to claim 1, wherein a swiveling lever is connected to at least one of the pot pivot axle and the lid pivot axle in a torque-proof manner, said swiveling lever(s) being coupled to the linear drive.

3. The cooking appliance according to claim 1, wherein the pot pivot axle and the lid pivot axle are coupled to each other via a linkage.

4. The cooking appliance according to claim 3, wherein the linear drive is integrated in the linkage and propels it.

5. The cooking appliance according to claim 4, wherein the linear drive being able to adopt different stop positions, the linear drive forming a linkage portion.

6. The cooking appliance according to claim 1, wherein the linear drive being able to adopt different stop positions.

7. The cooking appliance according to claim 6, wherein the linear drive has its two axial ends coupled to bearings which can be moved through the linear drive.

8. The cooking appliance according to claim 6, wherein the linear drive has pod-side axial end and a lid-side axial end, the lid-side end being provided with a first stop for limiting the lid's swiveling movement, the lid being able to be swiveled from its closed position to its open position up to the moment of reaching said stop, and the pot-side end of the linear drive being moved as from the moment of reaching said stop.

9. The cooking appliance according to claim 6, wherein the linear drive has a lid-side axial end and wherein a guide is provided at the lid-side end for the linear drive.

10. The cooking appliance according to claim 9, wherein the guide is formed by an elongated hole in which a protrusion can move which can be translated by the linear drive.

11. The cooking appliance according to claim 10, wherein the elongated hole has at least one end provided with an overrun portion which accommodates the overrun length of the drive after deactivation, the overrun portion forming an edge limiting the elongated hole and constituting an arc portion whose center lies on an imaginary center axis of the lid pivot axle.

12. The cooking appliance according to claim 10, wherein the elongated hole slopes down at its end associated to the raised lid to define a sloping end, a damping device being provided which dampens a lowering motion of the lid upon reaching said sloping end.

13. The cooking appliance according to claim 10, wherein a safety lock is provided preventing a transmission of a mechanical force for at least one of opening and closing the lid to the pot pivot axle, the safety lock being formed by the elongated hole which has a curved profile and comprises a locking portion extending transversely to a lid-side force transmission part, the opened lid being supported via the force transmission part on the locking portion.

14. The cooking appliance according to claim 1, wherein a safety lock is provided preventing a transmission of a mechanical force for at least one of opening and closing the lid to the pot pivot axle.

15. The cooking appliance according to claim 1, wherein the lid pivot axle is coupled to a gas pressure spring which allows the exertion of at least one of an opening torque and a closing torque on the lid pivot axle, the gas pressure spring allowing a mechanical pivoting of the lid.

16. The cooking appliance according to claim 15, wherein the opening movement of the lid has a first section which is effected by the drive and a subsequent second section which is accomplished by the gas pressure spring.

17. The cooking appliance according to claim 1, wherein stops are provided which are contacted consecutively over time when the drive is actuated in one direction, so that either the lid or the pot is swiveled.

18. The cooking appliance according to claim 1, wherein an integrated safety device is provided, comprising a position controller for a bearing and direct deactivation of the linear drive if the bearing leaves its position during the stroke.

19. The cooking appliance according to claim 1, wherein an electrical braking device for braking the drive as from the moment of reaching at least one predefined position of one of the linear drive, the lid and the pot is provided.

20. The cooking appliance according to claim 19, wherein the electrical braking device comprises a braking circuit for activating one of a reverse current and a short-circuit for the linear drive.

* * * * *